(12) United States Patent
Haigh

(10) Patent No.: US 9,890,509 B2
(45) Date of Patent: Feb. 13, 2018

(54) OFFSHORE STRUCTURE WITH SELF-INSTALL, SELF-LEVEL AND SELF-PILE CAPABILITIES

(71) Applicant: Renewable Hydrocarbons Ltd., Lancaster (GB)

(72) Inventor: Peter Haigh, Lancaster (GB)

(73) Assignee: RENEWABLE HYDROCARBONS LTD. (GB)

( * ) Notice: Subject to any disclaimer, the term of this patent is extended or adjusted under 35 U.S.C. 154(b) by 0 days.

(21) Appl. No.: 15/308,963

(22) PCT Filed: May 6, 2015

(86) PCT No.: PCT/GB2015/051332
§ 371 (c)(1),
(2) Date: Nov. 4, 2016

(87) PCT Pub. No.: WO2015/170098
PCT Pub. Date: Nov. 12, 2015

(65) Prior Publication Data
US 2017/0058474 A1     Mar. 2, 2017

(30) Foreign Application Priority Data
May 6, 2014   (GB) .................................. 1407991.7

(51) Int. Cl.
*E02D 7/00*     (2006.01)
*E02B 17/02*    (2006.01)
(Continued)

(52) U.S. Cl.
CPC ............ *E02B 17/02* (2013.01); *E02B 17/027* (2013.01); *E02D 5/22* (2013.01); *E02D 7/20* (2013.01);
(Continued)

(58) Field of Classification Search
CPC ......... E02B 17/02; E02B 17/027; E02D 5/22; E02D 7/20; F03B 13/00; F03B 13/26; F03D 13/22
See application file for complete search history.

(56) References Cited

U.S. PATENT DOCUMENTS 4,279,313 A     7/1981  Jansz
4,432,671 A  *  2/1984  Westra .................... B63B 21/27
                                                114/296
(Continued)

FOREIGN PATENT DOCUMENTS

AU     2012288595     2/2014
CA     2829739        9/2012
(Continued)

OTHER PUBLICATIONS

Corresponding International Search Report and Written Opinion for PCT/GB2015/051332 dated Jul. 8, 2015. WO.

*Primary Examiner* — Benjamin F Fiorello
(74) *Attorney, Agent, or Firm* — The Belles Group, P.C.

(57) ABSTRACT

A offshore structure (10) comprising a tube (12) having a longitudinal axis (32) and comprising an open-ended lower end (22) whose peripheral edge (24) is adapted to cut into the sea bed (14) as the offshore structure (10) is driven into it, the offshore structure (10) comprising: a plurality of stabilisers (18) each comprising a main body portion forming a hollow interior volume (23) and having an open lower end (22) whose peripheral edge (24) is adapted, in use, to cut into the sea bed (14), whereby in use, a trapped volume of fluids is retained in the hollow interior volume between the main body portion and the sea bed (14), each stabiliser (18) further comprising an outlet (34) communicating with its respective hollow interior volume (23) and a control means (36) to control, in use, the egress of the trapped volume of fluids from the hollow interior volume (23) of each respec- (Continued)

tive stabiliser (18), and wherein the geometric centres of the hollow interior volumes (23) of the stabilisers (18) are radially offset (44) from the longitudinal axis (32) of the offshore structure (10).

19 Claims, 6 Drawing Sheets

(51) Int. Cl.

| | | |
|---|---|---|
| *F03B 13/00* | (2006.01) | |
| *F03D 13/20* | (2016.01) | |
| *E02D 5/22* | (2006.01) | |
| *E02D 7/20* | (2006.01) | |
| *F03B 13/26* | (2006.01) | |
| *H02K 7/18* | (2006.01) | |
| *E02B 17/00* | (2006.01) | |

(52) U.S. Cl.
CPC ............... *F03B 13/00* (2013.01); *F03B 13/26* (2013.01); *F03D 13/22* (2016.05); *H02K 7/1823* (2013.01); *E02B 2017/0065* (2013.01); *E02B 2017/0073* (2013.01); *E02B 2017/0078* (2013.01); *E02D 2250/0053* (2013.01); *Y02B 10/30* (2013.01); *Y02E 10/38* (2013.01); *Y02E 10/72* (2013.01)

(56) References Cited

U.S. PATENT DOCUMENTS

| | | | |
|---|---|---|---|
| 4,733,993 A | 3/1988 | Andreasson | |
| 5,558,469 A | 9/1996 | Hellerman | |
| 6,354,767 B1* | 3/2002 | Jones | E02D 13/04 |
| | | | 405/228 |
| 6,685,396 B1* | 2/2004 | Bergeron | B63B 21/04 |
| | | | 114/296 |
| 7,918,287 B2* | 4/2011 | Foley | E21B 7/124 |
| | | | 175/20 |
| 8,684,629 B2* | 4/2014 | Asplund | E02D 27/52 |
| | | | 405/224 |
| 8,911,180 B2* | 12/2014 | Finkenzeller | E02D 5/801 |
| | | | 175/7 |
| 2013/0220699 A1 | 8/2013 | Bauer et al. | |
| 2014/0056649 A1 | 2/2014 | Berry et al. | |
| 2015/0010365 A1* | 1/2015 | Nielsen | E02D 27/42 |
| | | | 405/224 |

FOREIGN PATENT DOCUMENTS

| | | |
|---|---|---|
| CA | 2775854 | 11/2012 |
| CN | 201943084 | 8/2011 |
| CN | 202745037 | 2/2013 |
| GB | 1321995 | 7/1973 |
| GB | 2079826 | 1/1982 |
| GB | 2507362 | 4/2014 |
| GR | 97100318 | 4/1999 |
| WO | 0171105 | 9/2001 |
| WO | 2013117197 | 8/2013 |
| WO | 2013122457 | 8/2013 |

* cited by examiner

OFFSHORE STRUCTURE WITH SELF-INSTALL, SELF-LEVEL AND SELF-PILE CAPABILITIES

This invention relates to improvements in and relating to offshore structures and sub-sea piling, and in particular, but without limitation to offshore structures comprising means for self-alignment.

Piles are engineering structures that are sunk into the ground to provide firm foundations for a structure or building placed on top of them. The correct placement and alignment of the piles is of great importance to ensure the safety, stability and structural integrity of a building or other structure placed on top of them. It is therefore of paramount importance that the placement, alignment and depth of piles is correct to ensure that the top of the pile is located in the correct position, and also that the inclination of the pile is in accordance with design specifications (usually vertical) to ensure that loads are transmitted correctly into the pile and the surrounding earth.

Above ground, it is a relatively straightforward matter to position and align piles because engineers usually have open access to the ground surrounding the insertion point of the pile. This means that placement and alignment jigs placed on the surface around the insertion point can be used to ensure the correct placement and inclination of the pile as it is driven into the ground. Below water, for example, in offshore installations, however, the placement and alignment of piles is not at all straightforward. First, the ground level (i.e. the sea bed) is usually located out of sight, and so ROVs are needed to gain sight of the insertion point. Water currents and wave action also mean that it is difficult to hold a pile still during driving it into the sea bed, and further, the rising and falling of tides makes it difficult to position an engineering or support vessel over the pile to effect the driving.

These problems have been addressed in the past by the provision removable or sacrificial support frames that anchor to the sea bed and hold the pile at a desired position and/or orientation. Examples of such devices are described in US2014/0056649, PCT/GB2012/051108 and PCT/EP2012/054304.

More complex pile support structures comprise adjustable ball-and-socket type jigs that permit the accommodation of uneven seabed surfaces, an example of which is described in GB1321995.

Further examples of known means for stabilising sub-sea piles include the use of temporary guy wires anchored to the sea bed and, as described for example in CN201943084 for example, external guide vanes located on the exterior of the pile to guide it along a particular trajectory during driving.

The above identified disclosures are a representative sample of known systems for stabilising, aligning and supporting piles during the driving thereof.

Whilst known pile stabilisers can be configured to operate adequately across a broad range of applications, they nevertheless require additional engineering work to install the support system, for example, a pre-installation procedure before the pile is brought to site. Existing pile placement and alignment systems also lack general automation that can correct for misalignments occurring after the driving operation begins.

This invention aims to provide a solution to one or more of the above problems and/or to provide an improved and/or alternative pile, or pile alignment system.

Various aspects of the invention are set forth in the appendent claims.

According to an aspect of the invention, there is provided an offshore structure which can be floated to an offshore location, for example using tugs, and installed using the self-levelling and self-piling capabilities described herein. The offshore structure is suitable for use in a number of applications, including, but without limitation, to: provide an offshore oil & gas platform; support an offshore wind turbine; and provide a single leg, extension to existing offshore structures According to another aspect of the invention there is provided a offshore structure comprising a tube having a longitudinal axis and comprising an open-ended lower end whose peripheral edge is adapted to cut into the sea bed as the pile is driven into it, the offshore structure comprising: a plurality of stabilisers each comprising a main body portion forming a hollow interior volume and having an open lower end whose peripheral edge is adapted, in use, to cut into the sea bed, whereby in use, a trapped volume of fluids is retained in the hollow interior volume between the main body portion and the sea bed, each stabiliser further comprising an outlet communicating with the hollow interior volume and a control means to control, in use, the egress of the trapped volume of fluids from the hollow interior volume of each respective stabiliser, and wherein the geometric centres of the hollow interior volumes of the stabilisers are radially offset from the longitudinal axis of the offshore structure.

Another aspect of the invention provides an underwater pile comprising a tube open at its lower end to provide a peripheral edge to be driven, in use, into the sea bed under the action of a down-force, the tube having a longitudinal axis and the offshore structure being characterised by a plurality of stabilisers fixed relative to the tube, wherein the stabilisers are located at different circumferential positions around the longitudinal axis and are radially offset from the longitudinal axis, wherein each stabiliser comprises a chamber for containing, in use, a quantity of water having an open lower end arranged, in use, to engage the sea bed, and an outlet comprising a control means for controlling the bleeding of fluids from within each chamber.

The invention thus provides a plurality of stabilisers that are radially offset from the longitudinal axis of the offshore structure, and which act on the sea bed as the offshore structure is driven into it. Suitably, the stabilisers are rigidly affixed to the offshore structure such that as the offshore structure is sunk into the sea bed, so too are the stabilisers. In so doing, during driving of the offshore structure into the sea bed, earth (sea bed) and water enters the open ends of the stabilisers and pressurises the trapped volume of fluids within them, thus forming a resistance to the driving of the offshore structure into the sea bed.

Further, the outlet and control means enable the pressure within each of the stabilisers to be released (i.e. the trapped fluids to be bled) in a controlled manner by the control means, thus permitting each of the stabilisers to sink into the earth (sea bed) at locations surrounding the longitudinal axis of the offshore structure by a controlled amount. By controlling the operation of the control means, the back-pressure exerted by each of the stabilisers on the offshore structure can be controlled, and because the stabilisers are radially offset from the longitudinal axis of the offshore structure, this can be used to control the descent, and angle of descent, of the offshore structure during the driving operation.

Put another way, the laterally spaced stabilisers dig into the sea bed and contain a trapped volume of sea fluids. As the main pile sinks, the water pressure of the trapped fluids inside the stabilisers creates an up-thrust that resists the downward movement of the pile. Fluids can be bled from each of the stabilisers to exert different amounts of resistance on either side of the longitudinal axis of the pile, thereby guiding it vertically. The trapped fluids in the stabilisers can be bled via computer control connected to an attitude sensor, such that the pile self-stabilises or aligns itself with a desired orientation (e.g. vertically) via a feedback control loop between the attitude sensor(s) and the bleed valve(s) of the stabilisers.

Suitably, the invention provides a number of features and advantages, which include, but which are not limited to, a single leg, which provides the platform support.

Suitably, the support structure of the invention is sealed for installation so that the structure can float. The seal may be removable at an appropriate time during the installation phase, e.g. to flood and begin sinking the tube. The foundation (lower end of the tube) is open-ended and may be separated from a main part of the leg by a diaphragm, which allows the leg to be filled with seawater (either by shutting in the high tide level or by pumping seawater into the leg) to provide weight, which may be one element of the driving force for piling. In certain embodiments, the tube may remain filled with seawater during the platform's life, which can often remove the instability caused by the buoyancy of the structure. In an oil & gas platform application, a single leg can incorporate the well conductors within the structure.

In one embodiment of the invention, the stabilisers are provided externally of the tube of the pile. Suitably, the stabilisers can be affixed to the exterior of the pile's tube by rigid struts, arms or linkages, or by or vanes, the latter of which may also be used to control the trajectory of the descent of the pile into the sea bed.

In another embodiment of the invention, the stabilisers are provided internally of the pile's tube. Such a configuration advantageously reduces the overall dimensions of the lower end of the pile (compared to an arrangement with external stabilisers). Further, such a configuration, in principle, means that there could be no limit to the depth to which the pile could be sunk into the sea bed, as opposed to this dimension being limited by the height of the stabilisers if they are mounted externally of the pile.

Locating the stabilisers internally of the pile could be achieved by the lower end of the pile comprising one or more dividers that form separate open-ended tube portions within the end of the pile. Each tube partition suitably comprises a closed upper end through which the outlet and/or control means communicates enabling fluids to be bled in a controlled manner from each of the tube portions.

Any number of stabilisers may be provided, although it is envisaged that two or more stabilisers are provided to permit the angle of inclination in any direction to be controlled.

The pile can be driven into the ground by any suitable means, for example, by hammering, or by evacuating the pile, as is known in "suction piles". Where suction is used to drive the pile into the sea bed, the stabilisers can be operated at a positive internal pressure to resist the driving of the pile, or at a negative internal pressure, i.e. by sucking trapped fluids out from within their hollow interior volumes via the outlet, to aid the driving of the pile into the sea bed.

The control means suitably comprises a valve. In an alternative embodiment of the invention, the control means comprises a pump. The control means is suitably computer-controlled such that the alignment of the pile is automated. The pile suitably comprises one or more attitude sensors for sensing the angle of inclination of the pile, for example, the angle between its longitudinal axis and the vertical. The attitude sensor or sensors are suitably operatively connected to a computer, which automatically controls the actuation of the stabilisers' valves and/or pumps.

The control means may comprise an actuated valve, e.g. a pneumatic valve, a hydraulic valve or an electric valve.

The computer suitably comprises a control feedback device interposed between the attitude sensor and each of the actuated control means for automatically restoring the pile to a vertical orientation.

One or more pressure sensors may be provided within the stabilisers for sensing the pressure of the trapped volume of fluids within them. Suitably, the pressure sensors are also operatively connected to the computer for controlling the descent of the pile into the sea bed.

Thus, the invention subsists in the controlled bleeding of fluid-filled chambers that exert pressure on the sea bed at offset positions relative to the longitudinal axis of the main pile tube.

The lower peripheral edges of the pile and stabilisers may be chamfered to form a blade to facilitate driving the pile or stabilisers into the sea bed.

Preferred embodiments of the invention shall now be described, by way of example only, with reference to the accompanying drawings in which.

Figure 1:
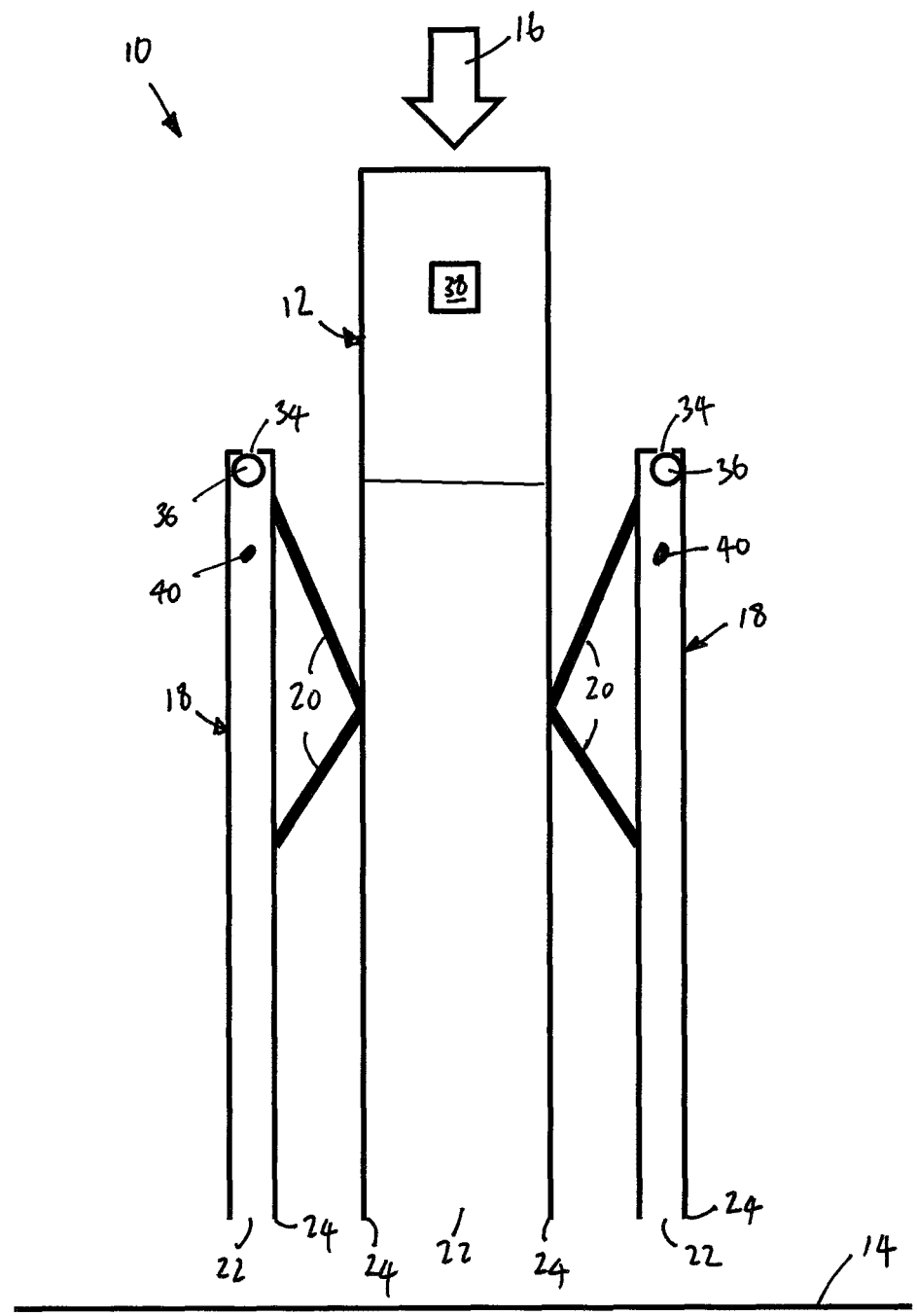
FIGS. 1 to 3 are schematic longitudinal-sections of a first embodiment of a pile in accordance with the invention.
Figure 2:
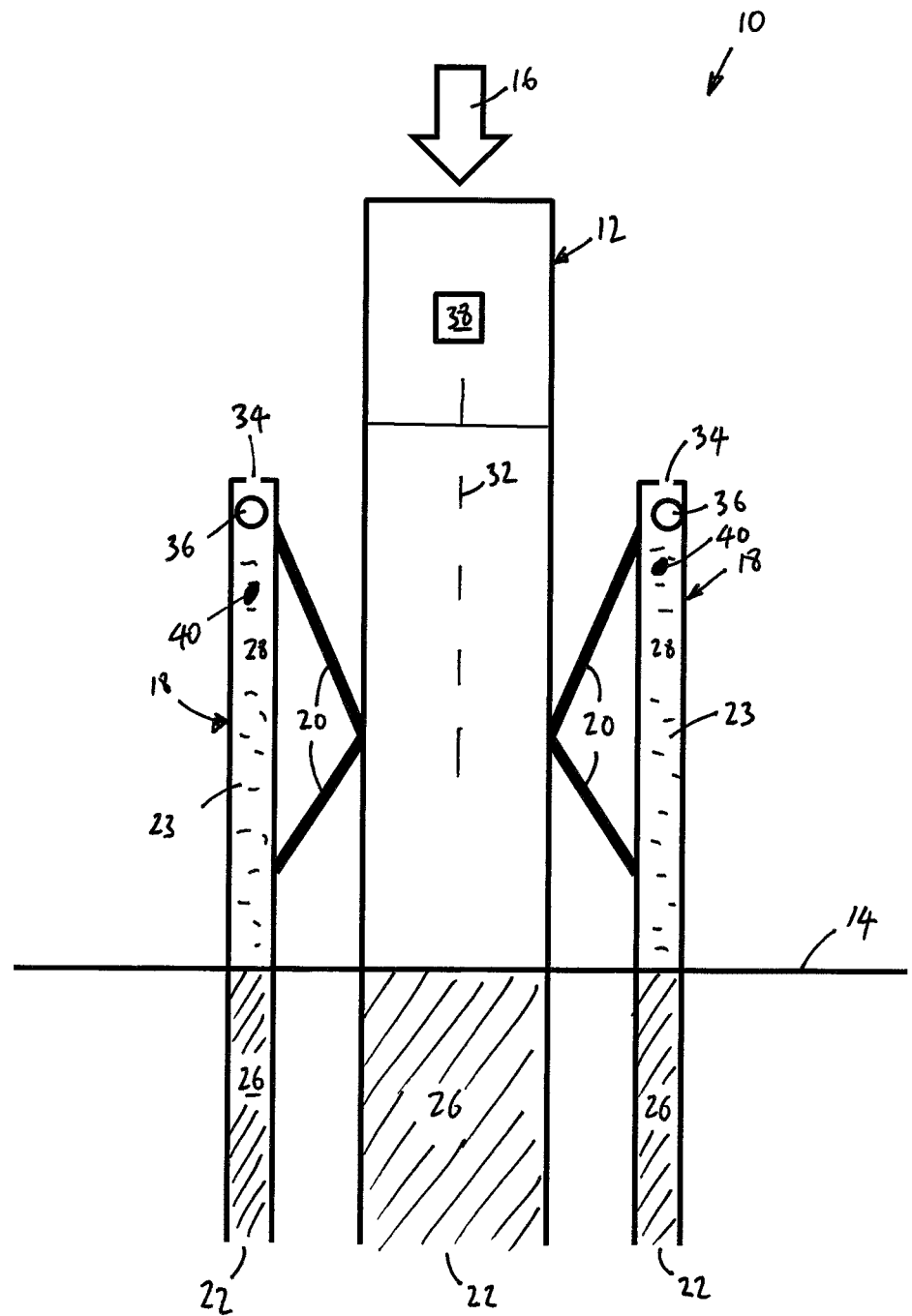
Figure 3:
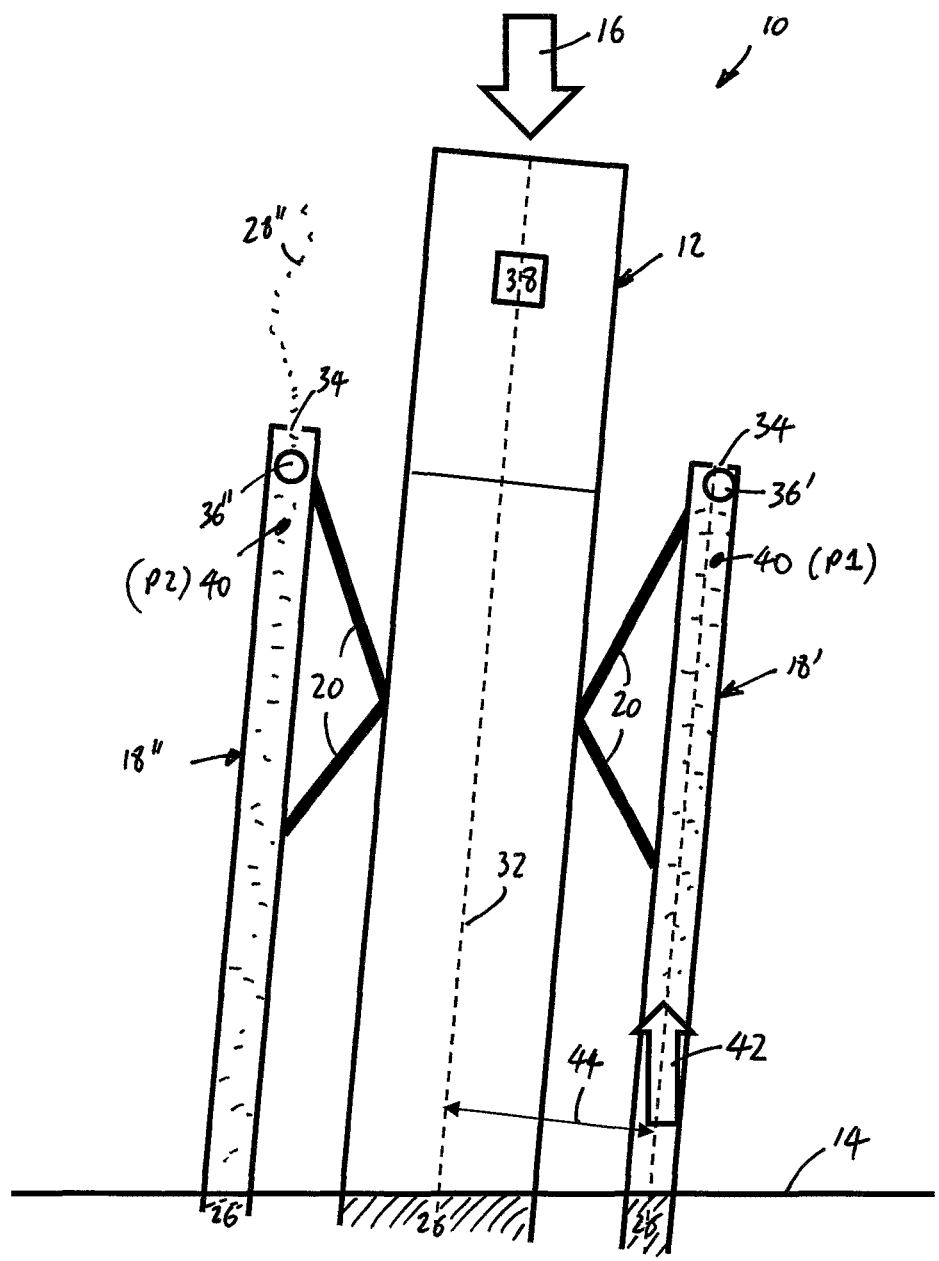

In FIGS. 1 to 3, an offshore structure 10 in accordance with the invention comprises a main structural tube 12 that is driven into the sea bed 14 by a driving force 16. In certain embodiments, the driving force may be provided by a hammering device, whereas in other embodiments, the driving force may be additionally or alternatively provided by suction, that is to say, the main tube may comprise a suction pile.

The pile comprises four stabilisers 18 (only two of which are shown in the drawings) that are located outwardly of the main structural tube 12, and which are evenly spaced apart around the circumference of the main structural tube 12. Each of the stabilisers 18 is rigidly affixed to the exterior of the main support tube 12 by a series of struts 20, which have been greatly simplified in the drawings.

As can be seen in FIG. 1, the main structural tube 12 and each of the stabilisers 18 is manufactured from a hollow tube having an open lower end 22. The lower edge 24 of each of the tubes is chamfered to form a blade that facilitates driving the pile 10 into the sea bed 14.

As can be seen in FIG. 2, as the pile 10 is driven 16 into the sea bed 14, earth 26 occupies the lower end of the tubes and closes off their open ends 22 to form a closed interior volume 23, which is filled with fluids 28. It will be appreciated that as the pile 10 is driven into the sea bed 14, the trapped volume of fluids 28 in each of the stabilisers 18 becomes pressurised and exerts an upward force on the main support tube 12, via the struts 20. The stabilisers 18 are spaced radially outwardly from the centreline (longitudinal axis) 32 of the main tube 12, and thus serve to stabilise it.

Each of the stabilisers 18 comprises an outlet aperture 34 at, or towards, its upper end, through which the pressurised trapped fluids 28 can be bled to release the internal pressure, and thus reduce the up-force exerted by each of the stabilisers 18 on the main structural tube 12. A control valve 36 is associated with each of the outlet apertures 34 enabling the bleeding of each stabiliser 18 to be effected independently.

The pile 10 comprises an attitude sensor 38, which senses the attitude of the pile 10 as it is driven into the sea bed 14. The attitude sensor 38 is connected to a computer (not shown), which controls the opening and closing of the valves 36. Pressure sensors 40 are also provided within each of the enclosed volumes of the stabilisers 18 for monitoring the water pressure within them.

The invention is useful for guiding the pile 10 into the sea bed 14 at a desired angle, as is shown schematically in FIG. 3 of the drawings, whereby the pile 10 has started to tilt. The tilt angle has been greatly exaggerated in FIG. 3 to better illustrate the concept.

In FIG. 3, the pile 10 has started to tilt off-vertical, and this is detected by an inclination sensor 38 affixed to the pile 10. A computer (not shown) thus closes the valve 36' of the lowermost stabiliser 18' to cause the internal pressure P1 within the lowermost stabiliser 18 to increase. At the same time, the valve 36" of the opposite stabiliser 18" is opened to release the water 28" and thus the pressure P2 within it 18", thus releasing any up-thrust on the higher side of the pile 10. It will be appreciated that the water pressure P1 within the lowermost stabiliser 18' increases and exerts a restorative force 42 on the main tube 12 at a distance 44 from the centreline of the main tube. This rights the pile 10 to the desired angle, as sensed by the attitude sensor 38, whereupon all of the valves 36' 36" can be balanced or opened to resume driving of the pile 10 in the manner previously described.

The sensing of the pressures P1 P2 within the stabilisers, the angle of the pile 10 and the opening and closing of the outlets 34 is carried out in real-time to ensure that the pile 10 is driven into the sea bed 14 at a desired angle. Thus, the pile 10 is self-righting: relying only on differential pressure P1 P2 within the stabilisers 18 to create restorative forces 42 offset 44 from the longitudinal axis 32 of the main tube 12 to achieve this.

Figures 4, 5:
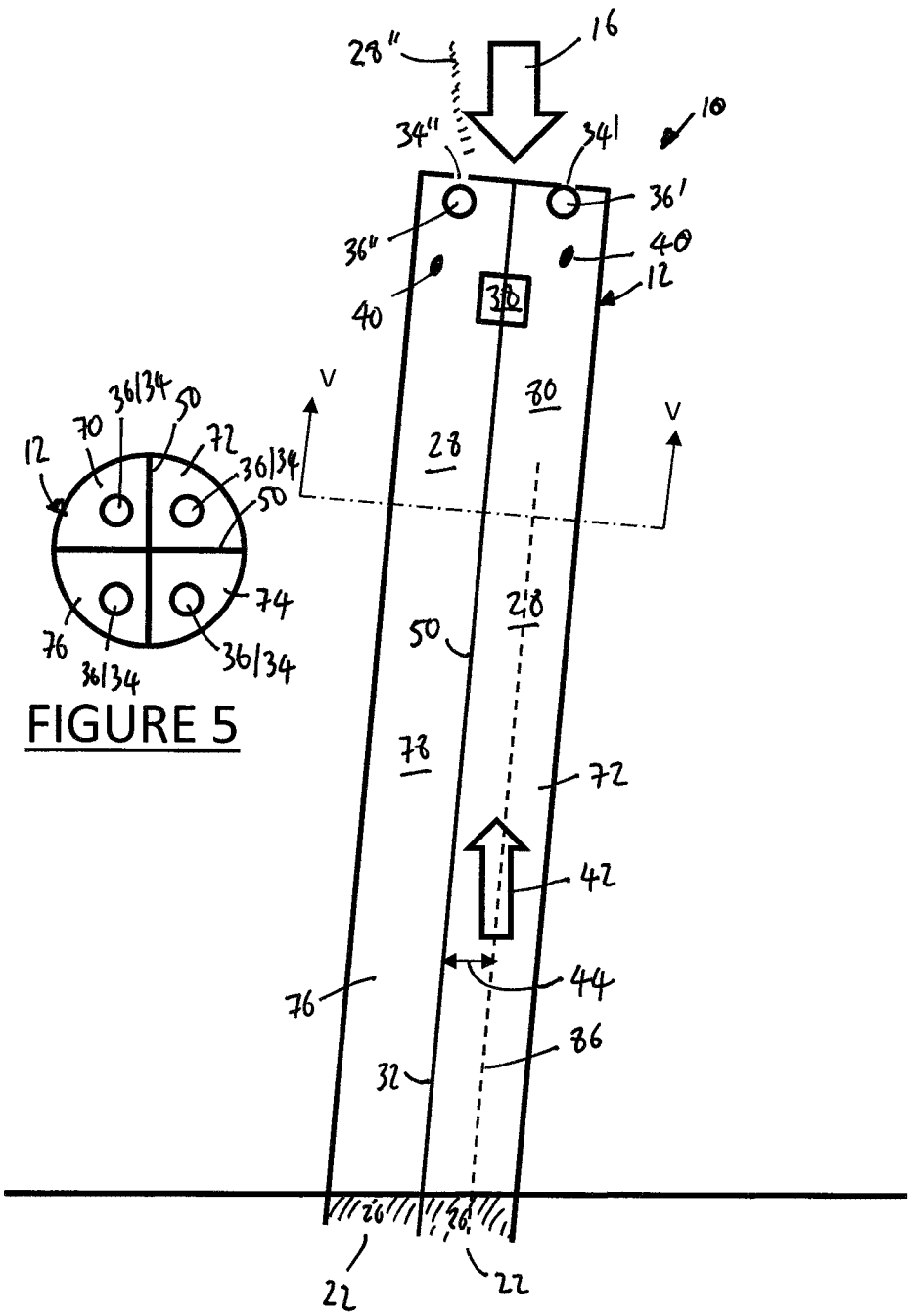
FIGS. 4 and 5 are schematic longitudinal and cross-sections, respectively, of a second embodiment of a pile in accordance with the invention.

A first alternative embodiment of the invention is shown in FIG. 4, whereby the main tube 12 of the pile 10 comprises internal dividers 50 that divide the interior volume of the main tube 12 into three or more (but four in the illustrated example) segments 70, 72, 74, 76. Each of the segments has an open bottom end 22 and a closed upper end, which forms a trapped interior volume 78, 80 as is the case with the external stabilisers previously described. Each of the segments 70, 72, 74, 76 has its own control valve 36 and outlet 34 for bleeding fluids from thin the respective segment as the pile 10 is driven into the sea bed.

It will be appreciated that the embodiment of FIG. 4 is more compact, at the expense of a smaller restoring moment (the distance between the centres of each segment 86 from the centreline 32 of the main tube 12 being smaller than is the case with external stabilisers). Nevertheless, the configuration shown in FIG. 5 is able to self-right using the internal pressure of fluids 28 within each of the segments, in the manner previously described.

In FIG. 4, the pile 10 is shown tilting at an exaggerated angle, and it will be noted that the bleed valve 36' of the lowermost segment 72 has been closed to increase the water pressure of the fluids trapped within it. Conversely, the bleed valve 36" of the opposite segment 76 has been opened to allow fluids 28" to be bled out of that segment via the outlet 34". Thus, a pressure differential is created between the opposite segment 76, thereby creating a net restoring force 42 acting through the geometric centre of the lowermost segment 72 at a distance 44 offset from the centreline 32 of the main tube 12. As previously described, the opening and closing of the valves 36 is effected automatically under computer control, based on pressure 40 and attitude 38 sensor readings.

Figure 7:
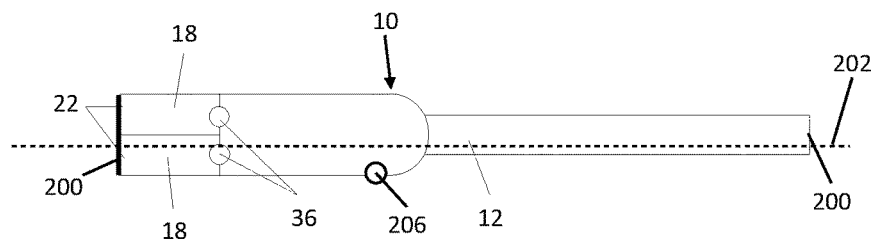
FIGS. 7, 8 and 9 are an installation sequence for an embodiment of the invention.
Figure 8:
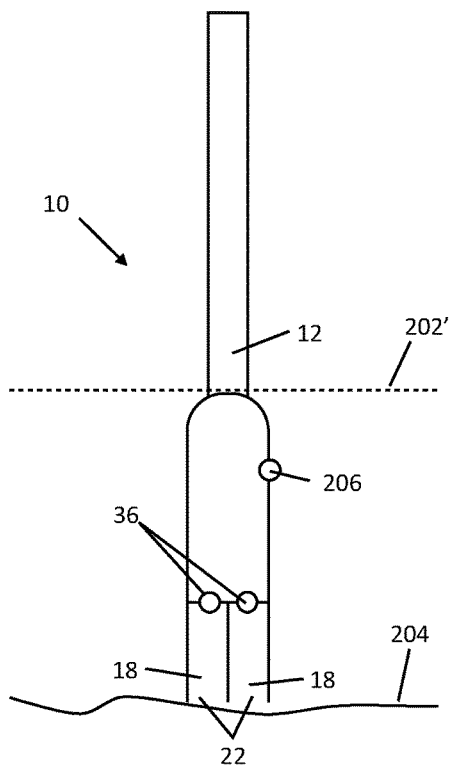
Figure 9:
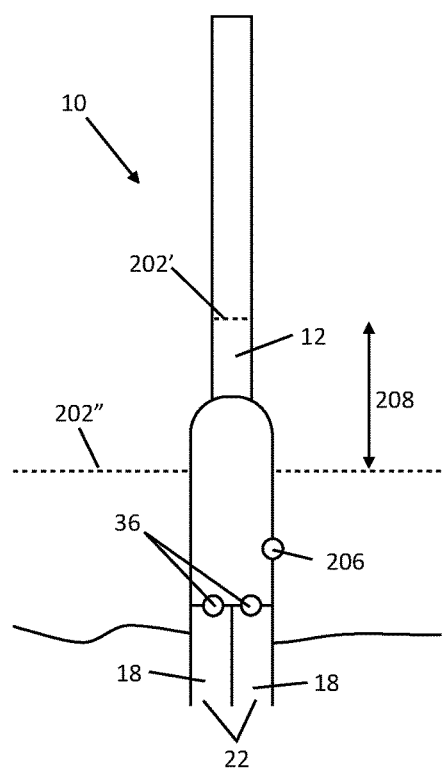

In FIGS. 7, 8 and 9, an installation sequence for a yet further embodiment of the invention is shown schematically and not to scale, in which the open ends 22 of the main tube 12 of the offshore structure 10 are closed off by sealing diaphragms 200, thus enabling the offshore structure 10 to float in a body of water 202. The sealing diaphragm can, in certain embodiments, be fitted to the upper end, lower end, or both ends of the pile. The offshore structure 10 can thus be floated and towed to an installation location, and the sealing diaphragm 200 broken to begin flooding the tube 12. Upon doing so, the offshore structure 10 will right itself, and begin descending towards the sea bed 204, where it will rest initially, kept approximately vertical by the weight of water within its lowermost portion and its buoyant (empty) uppermost portion.

Eventually, the open ends 22 of the offshore structure 10 will come to rest on the sea bed 204, as shown in FIG. 8, and at high tide 202', a tube flooding valve 206 can be closed to retain the water level within the tube 12 at the high tide level.

As the tide lowers, as shown in FIG. 9, the water level 202' within the tube 12 is greater than the instantaneous sea level 202", thus weighting the offshore structure 10 and driving it into the sea bed 204.

The control valves 36 can be opened, as desired, to control the descent of the offshore structure 10 into the sea bed 204, as previously described, and because there are a number of chambers 18 within the offshore structure 10, the offshore structure 10 can self-level, under computer control, also as previously described.

If the head 208 of pressure reduces too far, or if it is insufficient in the first place, the water level 202' within the tube 12 can be increased by pumping more water into the tube 12 using a pump (not shown), or installation can be halted until the next high tide, at which point the tube flooding valve 206 can be re-opened to re-fill the interior of the tube 12 to a desired level.

It will be appreciated that the invention provides an offshore structure that can be floated and towed so site, can be sunk under computer control, and which can self-install and self-level, with little or no user input. Further, because the embodiment of the invention illustrated in FIGS. 7 to 9 in particular of the drawings relies on available water levels, the power and support requirement of the installation is greatly reduced compared with known pile driving systems and procedures.

Figure 6:
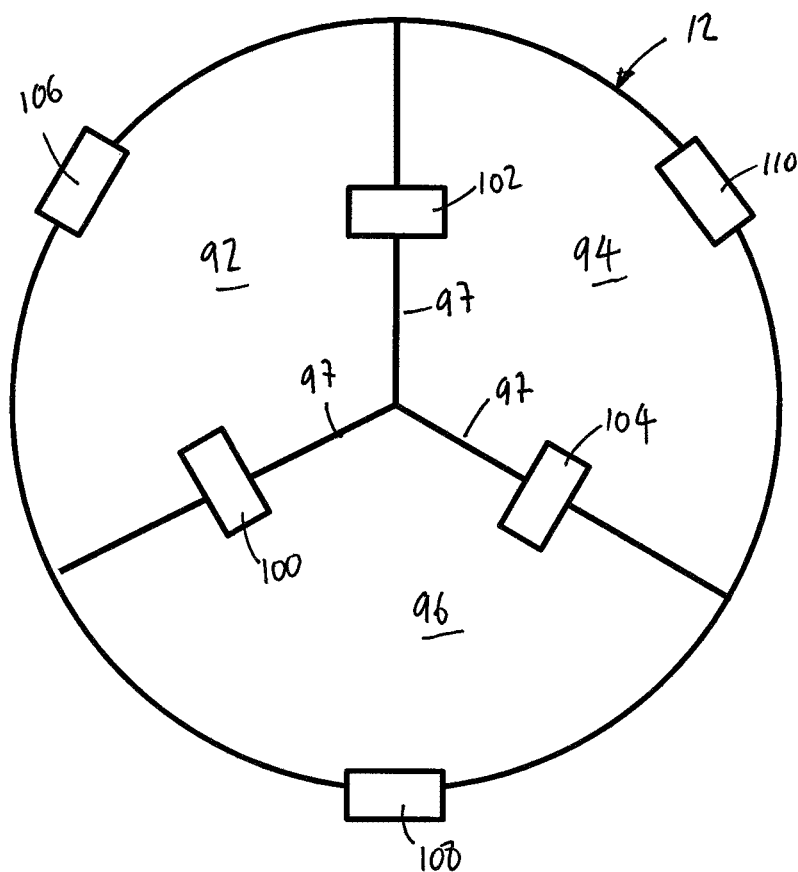
FIG. 6 is a schematic cross-section of a third embodiment of a pile in accordance with the invention.

A further embodiment of the invention is shown in FIG. 6 of the drawings whereby the interior of the main tube 12 is divided into three compartments 92, 94, 96 by dividers. A respective turbine 100, 102, 104 extends through each of the dividers 97, which can be used, once the pile 10 has been installed, for generating electricity by storing fluids at high and low tide, and by allowing the water within each of the compartments 92, 94, 96 to flow between the respective compartments. Each of the compartments has an openable and closeable sea aperture 106, 108, 110 to enable the compartments to be selectively filled to high tide level, or emptied to a low tide sea level, as required. The mode of operation of this tidal power generation and storage system is described fully in UK patent application No: GB1304756.8 (published as GB2507362) and in PCT patent application No: PCT/GB2014/050809.

In short, the tidal power generation and storage system works by providing three tanks 92, 94, 96 located in a tidal sea, a first 92 and second 94 one of the tanks each comprising a selectively openable and closeable sea aperture 106, 104 in fluid communication with the sea, the system being configured such that: the first tank's sea aperture 106 is openable on flood tide to fill the first tank 92 with seawater to a level corresponding substantially to a high tide level; and the second tank's sea aperture 110 is openable on an ebb tide to substantially empty the second tank 94 of seawater to a level corresponding with a low tide level, the system being characterised by: a first fluid passageway 102 extending between the first tank 92 and the second tank 94, the first fluid passageway comprising a first turbine-generator assembly 102 configured to generate a first power as water flows from the first tank 92 to the second tank 94, the first power being used to drive a pump 100 for pumping water from the first tank 92 to the third tank 96, and further comprising; a second fluid passageway 104 extending between the third tank 96 and the second tank 94, the second fluid passageway comprising a flow control means and a second turbine-generator assembly 104 configured to generate a second output power as water flows from the third tank to the second tank, the second output power being controllable by actuation of the flow control means.

The water level in the third tank can be maintained at a higher level than the water in the first tank, and the water level in the first tank can be maintained at a higher level than the water in the second tank Alternatively, the tidal power generation and storage system works by providing three tanks located in a tidal sea, a first and second one of the tanks each comprising a selectively openable and closeable sea aperture in fluid communication with the sea, the system being configured such that: the first tank's sea aperture is openable on a flood tide to substantially fill the first tank with seawater to a level corresponding to a high tide level; and the second tank's sea aperture is openable on an ebb tide to substantially empty the second tank of seawater to a level corresponding with a low tide level, the system being characterised by: a first fluid passageway extending between the first tank and the second tank, the first fluid passageway comprising a first turbine-generator assembly configured to generate a first power as water flows from the first tank to the second tank, the first power being used to drive a pump for pumping water from the third tank to the second tank, and further comprising; a second fluid passageway extending between the first tank and the third tank, the second fluid passageway comprising a flow control means and a second turbine-generator assembly configured to generate a second output power as water flows from the first tank to the third tank, the second output power being controllable by actuation of the flow control means.

The water level in the first tank can be maintained at a higher level than the water in the second tank, and the water level in the second tank can be maintained at a higher level than the water in the third tank.

The invention thereby provides a tidal power generation system that captures water in tanks at two different levels, namely the high tide sea level in the first tank and the low tide sea level in the second tank to maintain a head between the first and second tanks. The difference in the water levels in the first and second tanks can thus be used to continuously drive the first turbine-generator assembly for pumping water to or from the third tank. By so doing, a second head can be maintained between either: the third tank and the second tank; or between the first tank and the third tank, which second head can be used, via the second turbine-generator assembly, to selectively generate useful output power when required.

By the cyclical re-filling of the first tank at high tide and the emptying of the second tank at low tide, the first head can be maintained indefinitely.

By using the flow of water from the first tank to the second tank solely to pump water to or from the third tank, the available head for generating output power, that is to say, the head between the third tank and the second tank, or the head between the first tank and the third tank is independent of the instantaneous tide level. Also, such a configuration suitably enables the flow of water from the first tank to the second tank to be "stored" as a head between the third tank and the second tank, or the head between the first tank and the third tank, to enable power to be generated at will.

Suitably, supplementary renewable energy sources, for example, wind and/or solar power, may be used to drive a third pump which tops-up the level of water in third tank (according to the first aspect of the invention), or reduces the level of water in the third tank (according to the second aspect of the invention). Where wind power is used as a supplementary power source, an output of a wind turbine could be directly and/or mechanically linked to a pump such that losses are not incurred in the conversion of wind power to electrical power and back into mechanical effort in the pump's motor.

The pile 10 of the invention can be used as a support structure (e.g. the base of a mono-pile) for an offshore wind turbine, and the offshore wind turbine could be used to drive any of the pumps of the invention.

The pile may also be used to form the foundations for an offshore support structure, such as that described in UK patent application No: 1310272.8.

Such a support structure suitably comprises a hoisting device with a load transfer platform on top of it, which can be used for lifting payloads up the structure and for sliding them laterally onto a platform on top of the support structure.

Because the pile of the invention is manufactured from hollow tubing, it is possible to make it float, which is useful for delivering it to an offshore location. Further, because the main structural component of the pile is tubular, this makes the pile particularly suitable for use in drilling operations because one, but preferably many tubular guides for drill strings can pass through the main structure, thereby forming a guide for drilling operations.

The invention claimed is:
1. An offshore structure comprising:
   a main structural tube having a longitudinal axis and comprising an open-ended lower end whose peripheral edge is adapted to cut into the sea bed as the offshore structure is driven into it; and
   a plurality of stabilisers each comprising:
      a main body portion forming a hollow interior volume and having an open lower end whose peripheral edge is adapted, in use, to cut into the sea bed, whereby in use, a trapped volume of fluids is retained in the hollow interior volume between the main body portion and the sea bed;
      an outlet communicating with its respective hollow interior volume; and
      a control means to control, in use, the egress of the trapped volume of fluids from the hollow interior volume of each respective stabiliser; wherein the geometric centres of the hollow interior volumes of the stabilisers are radially offset from the longitudinal axis of the offshore structure;

the offshore structure being characterised by:

a diaphragm separating a foundation portion of the tube from a main leg portion of the tube;

a tube flooding valve and a control means adapted to open the tube flooding valve on a flood tide, and to close it on an ebb tide, such that a water level within the main leg portion is maintained at a level equal to or higher than the instantaneous sea level;

whereby the head of fluids within the main leg portion of the tube drives, or facilitates driving, the offshore structure into the sea bed.

2. The offshore structure of claim 1, further comprising a pump adapted to pump fluids into the tube.

3. The offshore structure of claim 1, comprising a plurality of stabilisers rigidly affixed externally of the tube.

4. The offshore structure of claim 1, comprising a plurality of stabilisers located internally of the tube.

5. The offshore structure of claim 4, wherein the lower end of the offshore structure's tube comprises one or more dividers that form separate open-ended tube portions within the end of the offshore structure tube.

6. The offshore structure of claim 1, further comprising a pump adapted to evacuate the interior of the tube so as to form a suction pile.

7. The offshore structure of claim 1, wherein the outlet and control means comprises an aperture in a wall of the stabiliser and a valve associated with the aperture, respectively.

8. The offshore structure of claim 1, wherein the control means is computer-controlled.

9. The offshore structure of claim 8, further comprising an attitude sensor for sensing the angle of inclination of the offshore structure, the attitude sensor being operatively connected to the computer, and wherein the computer is adapted to automatically control the opening and closing of the valve or valves to maintain the offshore structure at a desired orientation as sensed by the attitude sensor.

10. The offshore structure of claim 1, further comprising one or more pressure sensors located within the stabilisers for sensing the pressure of the trapped volume of fluids within them.

11. The offshore structure of claim 10, wherein the pressure sensors are operatively connected to a computer for controlling the descent of the offshore structure into the sea bed.

12. The offshore structure of claim 1, wherein the lower peripheral edges of the offshore structure are chamfered to form a blade.

13. The offshore structure of claim 1, further comprising a seal for sealingly closing the open ends of the tube and/or stabilisers.

14. The offshore structure of claim 1, wherein the interior of the main tube is divided into three compartments by dividers, and a respective turbine extends through each of the dividers, which can be used, once the offshore structure has been installed, for generating electricity by storing fluids at high and low tide, and by allowing the fluids within each of the compartments to flow between the respective compartments.

15. The offshore structure of claim 14, wherein each of the compartments has an openable and closeable sea aperture to permit, in use, the compartments to be selectively filled to high tide level, or emptied to a low tide sea level, as required.

16. The offshore structure of claim 15, wherein a first compartment's sea aperture is openable on flood tide to fill the first compartment with seawater to a level corresponding substantially to a high tide level; and the second compartment's sea aperture is openable on an ebb tide to substantially empty the second compartment of seawater to a level corresponding with a low tide level, the system being characterised by: a first fluid passageway extending between the first compartment and the second compartment, the first fluid passageway comprising a first turbine-generator assembly configured to generate a first power as water flows from the first compartment to the second compartment, the first power being used to drive a pump for pumping water from the first compartment to the third compartment, and further comprising; a second fluid passageway extending between the third compartment and the second compartment, the second fluid passageway comprising a flow control means and a second turbine-generator assembly configured to generate a second output power as water flows from the third compartment to the second compartment, the second output power being controllable by actuation of the flow control means.

17. The offshore structure of claim 15, wherein the first compartment's sea aperture is openable on a flood tide to substantially fill the first compartment with seawater to a level corresponding to a high tide level; and the second compartment's sea aperture is openable on an ebb tide to substantially empty the second compartment of seawater to a level corresponding with a low tide level, the system being characterised by: a first fluid passageway extending between the first compartment and the second compartment, the first fluid passageway comprising a first turbine-generator assembly configured to generate a first power as water flows from the first compartment to the second compartment, the first power being used to drive a pump for pumping water from the third compartment to the second compartment, and further comprising; a second fluid passageway extending between the first compartment and the third compartment, the second fluid passageway comprising a flow control means and a second turbine-generator assembly configured to generate a second output power as water flows from the first compartment to the third compartment, the second output power being controllable by actuation of the flow control means.

18. The offshore structure of claim 1, formed as a mono-pile support structure.

19. The offshore structure of claim 18, wherein the mono-pile support structure forms part of any one or more of the group comprising: a drilling platform, foundations for an offshore support structure; an extension to a drilling platform; and a support for an offshore wind turbine.

* * * * *